US012320266B2

(12) United States Patent
Foroutan et al.

(10) Patent No.: US 12,320,266 B2
(45) Date of Patent: Jun. 3, 2025

(54) CONTAINMENT ENGINE CASE WITH LOCAL FEATURES AND INNER SURFACE REINFORCEMENT SECTION

(71) Applicant: PRATT & WHITNEY CANADA CORP., Longueuil (CA)

(72) Inventors: Rana Foroutan, St-Lambert (CA); Masoud Roshan Fekr, St-Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/461,888

(22) Filed: Sep. 6, 2023

(65) Prior Publication Data

US 2025/0075635 A1 Mar. 6, 2025

(51) Int. Cl.
*F01D 25/24* (2006.01)

(52) U.S. Cl.
CPC ........ *F01D 25/24* (2013.01); *F05D 2220/323* (2013.01); *F05D 2240/14* (2013.01)

(58) Field of Classification Search
CPC ...... F01D 11/08; F01D 11/125; F01D 11/127; F01D 21/045; F05D 2240/11; F05D 2240/14
See application file for complete search history.

(56) References Cited

U.S. PATENT DOCUMENTS 4,902,201 A * 2/1990 Neubert ................ F01D 21/045 181/204
5,482,429 A 1/1996 Penda
6,371,725 B1 4/2002 Manteiga et al.
6,739,830 B2 5/2004 Sathianathan et al.
7,334,984 B1 * 2/2008 Stine ..................... F01D 21/045 415/173.1
8,757,958 B2 6/2014 Lussier
9,546,563 B2 * 1/2017 Panambur ............... F01D 11/14
9,945,254 B2 4/2018 Ivakitch et al.
10,167,727 B2 * 1/2019 Vargas ............... B23K 15/0086
10,364,700 B2 7/2019 Olver et al.
(Continued)

FOREIGN PATENT DOCUMENTS

EP 2811122 B1 8/2017
EP 2815119 B1 1/2018
(Continued)

OTHER PUBLICATIONS

Extended European Search Report for EP Application No. 24199028.2, Dated Feb. 10, 2025, pp. 11.
(Continued)

*Primary Examiner* — Brian P Wolcott
(74) *Attorney, Agent, or Firm* — Kinney & Lange, P.A.

(57) ABSTRACT

A containment case includes an annular body bound by an inner surface and an outer surface and an outer surface feature extending outward from the outer surface and an inner surface feature extending inwards from the inner surface. The annular body includes a containment section and an inner reinforcement section radially inward from the inner surface subtending a sector of the containment section. The reinforcement section includes a reinforcement thickness that is greater than a casing thickness of the containment section at least partially coinciding with the outer surface feature.

16 Claims, 3 Drawing Sheets

(56) References Cited

U.S. PATENT DOCUMENTS

| | | | | |
|---|---|---|---|---|
| 10,533,449 | B2 | 1/2020 | Schoenhoff et al. | |
| 11,491,743 | B2 * | 11/2022 | Le Hong | B29C 70/24 |
| 11,530,622 | B2 | 12/2022 | Lefebvre et al. | |
| 11,891,910 | B2 * | 2/2024 | Bourolleau | F01D 25/24 |
| 12,055,054 | B2 | 8/2024 | Jain et al. | |
| 2004/0033137 | A1 | 2/2004 | Glover et al. | |
| 2005/0089390 | A1 | 4/2005 | Gerain et al. | |
| 2009/0293497 | A1 * | 12/2009 | Cloft | F02C 7/05 415/220 |
| 2011/0044806 | A1 | 2/2011 | Harper | |
| 2011/0154801 | A1 | 6/2011 | Mahan | |
| 2012/0148392 | A1 | 6/2012 | Lussier et al. | |
| 2012/0177490 | A1 | 7/2012 | Lussier et al. | |
| 2013/0153456 | A1 * | 6/2013 | Zhu | F01D 5/28 206/521 |
| 2015/0240662 | A1 | 8/2015 | Niggemeier et al. | |
| 2015/0275692 | A1 | 10/2015 | Robertson et al. | |
| 2016/0032776 | A1 | 2/2016 | Voleti et al. | |
| 2016/0177840 | A1 | 6/2016 | Robertson et al. | |
| 2016/0341070 | A1 * | 11/2016 | Garcia | F04D 29/023 |
| 2016/0341075 | A1 | 11/2016 | Liu et al. | |
| 2017/0198716 | A1 | 7/2017 | Crutchfield | |
| 2017/0198717 | A1 | 7/2017 | Crutchfield | |
| 2018/0230855 | A1 | 8/2018 | Heeter | |
| 2018/0298780 | A1 | 10/2018 | Kray et al. | |
| 2019/0323520 | A1 | 10/2019 | Lyders et al. | |
| 2020/0392872 | A1 | 12/2020 | Fleckenstein et al. | |
| 2022/0120196 | A1 | 4/2022 | Bourolleau et al. | |

FOREIGN PATENT DOCUMENTS

| | | | |
|---|---|---|---|
| GB | 2524229 | A | 9/2015 |
| WO | 2013095210 | A1 | 6/2013 |

OTHER PUBLICATIONS

Extended European Search Report for EP Application No. 24199048.0, Dated Feb. 10, 2025, pp. 11.

* cited by examiner

CONTAINMENT ENGINE CASE WITH LOCAL FEATURES AND INNER SURFACE REINFORCEMENT SECTION

BACKGROUND

The present disclosure relates generally to containment of gas turbine engine bladed rotors, and more particularly, to containment cases with additional features located within the containment section.

Gas turbine engines require containment of blades and rotor components following catastrophic failure. Some containment cases include attachments points or other features protruding inward or outward from the casing. When additional features are located within the containment section of the casing, the thickness of the casing is increased to counteract rupture of the casing following a blade or rotor segment impact in the vicinity of the feature. Further, casings with local features within the containment zone have increased containment thickness and weight for a given design impact energy relative to analogous casing without local features. Increased weight of the gas turbine engine decreases engine efficiency.

SUMMARY

A containment case, according to another example embodiment of this disclosure, includes an annular body, an outer surface feature, and an inner surface feature. The annular body is bound by an outer surface and an inner surface. The outer surface feature extends outward from the outer surface. The annular body includes a containment section and a reinforcement section. The containment section has a casing thickness defined by a radial distance between the inner surface and the outer surface. The reinforcement section subtends a sector of the containment section that defines a reinforcement thickness between the inner surface and the outer surface that is greater than the casing thickness. The outer surface feature at least partially coincides with the reinforcement section. The inner surface feature at least partially coincides circumferentially with the outer surface feature and the reinforcement section.

A gas turbine engine, according to another example embodiment of this disclosure, includes a blade rotor and a containment case. The bladed rotor is operatively associated with the direction of rotation about an axis of the gas turbine engine. The containment case includes an annular body, an outer surface feature, and an inner surface feature. The annular body is bound by an outer surface and an inner surface. The outer surface feature extends outward from the outer surface. The annular body includes a containment section and a reinforcement section. The containment section has a casing thickness defined by a radial distance between the inner surface and the outer surface. The reinforcement section subtends a sector of the containment section that defines a reinforcement thickness between the inner surface and the outer surface that is greater than the casing thickness. The outer surface feature at least partially coincides with the reinforcement section, which circumferentially precedes the outer surface feature relative to the direction of rotation. The inner surface feature at least partially coincides circumferentially with the outer surface feature and the reinforcement section.

DETAILED DESCRIPTION

Figure 1:
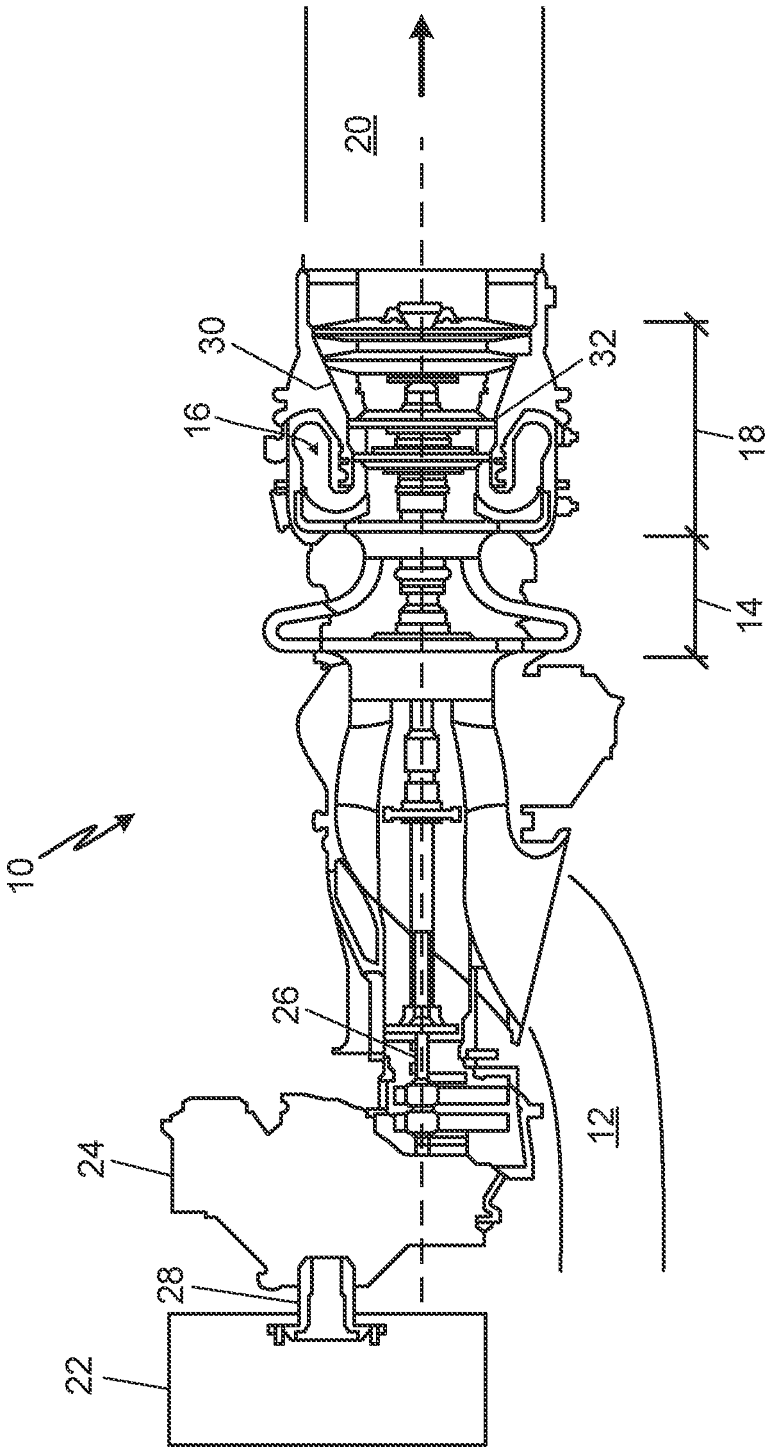
FIG. 1 is a schematic cross-sectional view of an example gas turbine engine that includes a containment case.

FIG. 1 is a schematic cross-sectional view of gas turbine engine 10, which is depicted as a turboprop engine. In other examples, gas turbine engine 10 can be a turboshaft engine or a turbofan engine. The architecture of gas turbine engine 10 depicts a forward-to-aft air flow path in which the engine ingest air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. The number of compressor stages and/or turbine stages depicted by FIG. 1 can be more stages or less stages in other examples of gas turbine engine 10.

As depicted in FIG. 1, gas turbine engine 10 includes, in serial flow communication, air inlet 12, compressor section 14, combustor 16, turbine section, and exhaust section 20. Compressor section 14 pressurizes air entering gas turbine engine 10 through air inlet 12. The pressurized air discharged from compressor section 14 mixes with fuel inside combustor 16. Igniters initiate combustion of the air-fuel mixture within combustor 14, which is sustained by a continuous supply of fuel and pressurized air. A heated and compressed air stream discharges through turbine section 10 and exhaust section 20. Turbine section 18 extracts energy from exhaust stream to drive compressor section 14 and other engine accessories such electrical generators and pumps for lubrication, fuel, and/or actuators.

Gas turbine engine 10 includes propeller 22, reduction gearbox 24, input shaft 26, and output shaft 28 for propelling an aircraft. Energy extracted by turbine section 18 drives input shaft 26, which is connected to an input of reduction gearbox 24. Reduction gearbox 24 drives output shaft 28 at a reduced speed proportional to a rotational speed of input shaft 26. Propeller 22 is rotationally coupled to output shaft 28, which drives propeller 22 during operation of gas turbine engine 10.

Compressor section 14 and turbine section 18 each includes one or more stages, each stage including at least one row of circumferentially spaced stationary vanes paired with at least one row of circumferentially spaced rotor blades. Compressor section 14 and turbine section 18 can include multiple compressor sections 14 and/or multiple turbine sections 18, each compressor section 14 connected to at least one corresponding turbine section 18 via a shaft. For instance, gas turbine engine 10 can include a low-pressure compressor, a high-pressure compressor, a high-pressure turbine, and a low-pressure turbine. The high-pressure compressor, high-pressure turbine, and high-pressure shaft form a high-pressure spool and the low-pressure compressor, low-pressure turbine, and low-pressure shaft form a low-pressure spool. The high-pressure spool is arranged concentrically with low-pressure spool. In such examples, air entering air inlet 12 flows through, in series communication, the low-pressure compressor and the high-pressure compressor of compressor section 14, combustor

16, the high-pressure and low-pressure turbines of turbine section 18 before discharging from exhaust section 20. In other examples, turbine section 18 can include a power turbine or free turbine which is not rotationally coupled to a compressor section 14 but is rotationally coupled to a propulsor such as propeller 22.

In each of the foregoing configurations, and other variants thereof, gas turbine engine 10 can include one or more containment cases 30 disposed about respective bladed rotors 32 of compressor section 14 and/or turbine section 18. Containment case 30 can be configured to enclose a single bladed rotor 32, or multiple axially adjacent bladed rotors 32. In each instance, containment case 30 or cases 30 can support stationary components of gas turbine engine 10 such as vanes, shrouds and baffles positioned radially inward from containment case 30 as well as components external or radially outward from case 30 such as bleed air pipe, electrical conduit, and/or lubrication lines, among other possible stationary components.

Bladed rotor 32 can be an integrally bladed rotor or a circumferential array of blades attached to a hub via a blade attachment such as a fir-tree or dovetail root. Each of the blades extends from a root to a tip in along a span direction and from a leading edge to a trailing edge in along a chord direction. The blade flanks include a suction side surface and a pressure side surface, each surface curved to form an airfoil profile along the chord direction from the leading edge to the trailing edge. Each bladed rotor 32 is operatively associated with a direction of rotation R about axis A of gas turbine engine 10. Compressor rotors, which impart work to the air flow, rotate in the direction of the pressure side surface. Turbine rotors, which extract work from the air flow, rotate in the direction of the suction side surface. Direction of rotation R may be described as clockwise or counterclockwise in the following disclosure, which refers to the direction of rotation as depicted in the figure.

Figure 2:
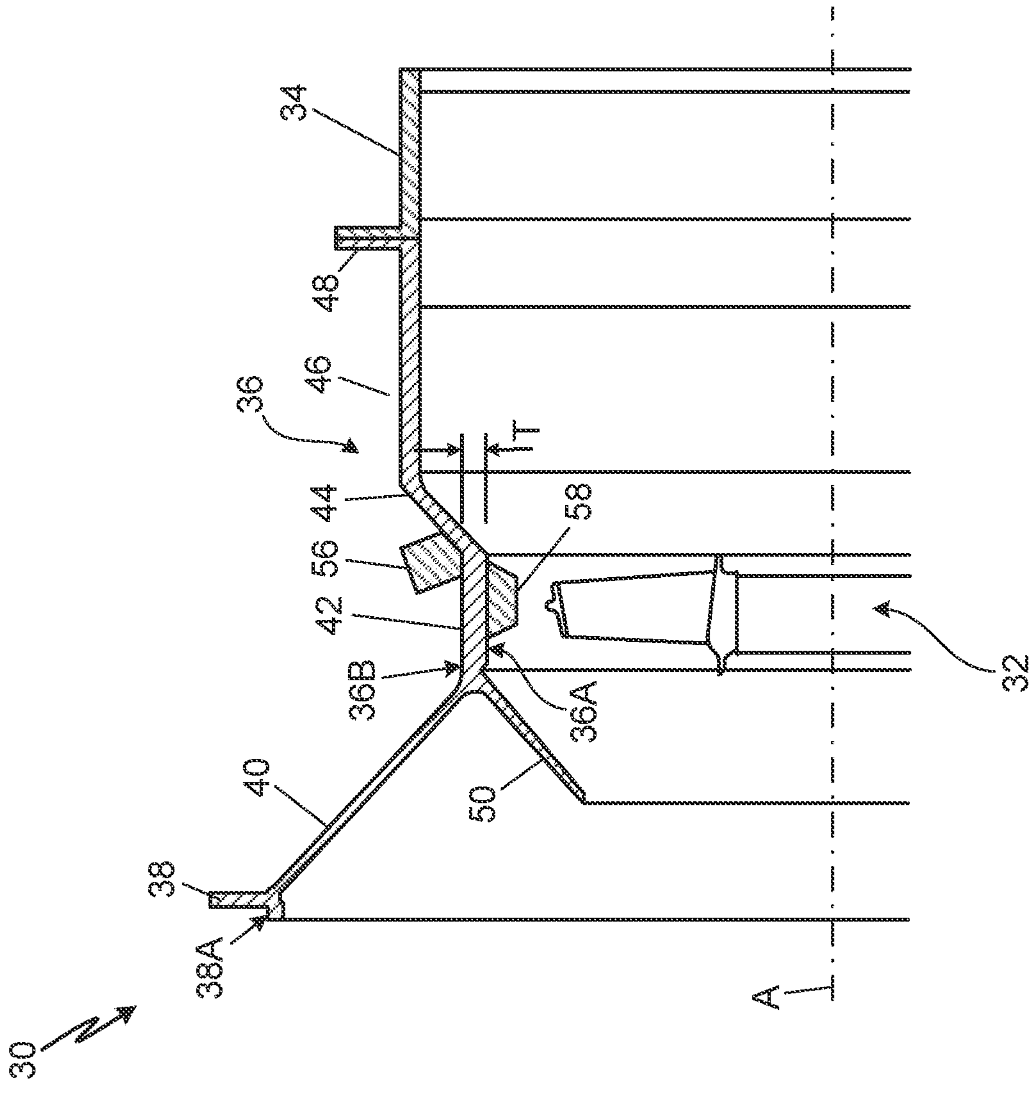
FIG. 2 is a cross-sectional view of the containment case of FIG. 1.

FIG. 2 is a simplified cross-sectional view of turbine section 18 that depicts an example containment case 30. Bladed rotor 32 and aft case 34 are also depicted by FIG. 2. Components radially outward from bladed rotor 32 and radially inward from containment case 30 are removed to reveal the inner surface of containment case 30. However, in operation, gas turbine engine 10 includes a blade outer air seal (BOAS) or a shroud positioned radially outboard from tips of bladed rotor 32 to define a flow path between the BOAS and platforms or endwalls of bladed rotor 32. As depicted, bladed rotor 32 includes a circumferential array of blades attached to a hub by a root attachment. In other examples, bladed rotor 32 can be an integrally bladed rotor manufactured from the same material stock.

Containment case 30 is formed by annular body 36 formed by multiple cylindrical and/or frustoconical sections, flanges, and other outer surface features and, in some examples, inner surface features. As depicted, containment case 30 includes upstream flange 38, frustoconical section 40, containment section 42, intermediate frustoconical section 44, cylindrical section 46, and downstream flange 48. In some examples, containment case 30 further includes frustoconical section 50. Annular body 36 is delimited by inner surface 36A and outer surface 36B, each extending axially from upstream flange 38 to downstream flange 48. Portions of inner surface 36A and outer surface 36B radially bound sections of annular body 36 discussed below. Further, containment case 30 includes reinforcement section 54, discussed in reference to FIG. 3.

Upstream flange 38 and downstream flange 48 are radial flanges that extend outward from annular body 36. Circumferentially spaced clearance holes extend through axial faces of upstream flange 38 and downstream flange 48 and are spaced along a radius common to each flange for attaching containment case 30 to an adjacent component using fasteners (not shown). FIG. 2 depicts containment case 30 attached to aft case 34 for illustrative purposes. Upstream flange 38, downstream flange 48, or both can include a pilot diameter. As shown, pilot diameter 38A extends axially from flange 38 to define a cylindrical surface on the exterior side of annular body 36. However, in other examples, pilot diameter 38A can be defined by a cylindrical surface on an interior side of annular body 36. Pilot diameter 38A, when present, facilitate alignment of containment case 30 with an adjacent component of gas turbine engine 10.

Frustoconical sections 40, 44, and 50 have a frustoconical shape that increases or decreases the radial dimension of annular body 36 such that containment case 30 conforms to rotor geometry of gas turbine engine 10. Frustoconical section 40 extends axially from upstream flange 38 to containment section 42, decreasing the radial dimension of annular body 36 towards containment section 42. Frustoconical section 44 extends from a downstream end of containment section 42 towards cylindrical section 46, increasing the radial dimension of annular body 36. Frustoconical section 50 extends forward and radially inward from an upstream end of containment section 42.

Containment section 42 is a cylindrical region of annular body 36 positioned radially outward from and axially coincident with bladed rotor 32. An axial extent of containment section 42 encompasses an axial extent of bladed rotor 32. A casing thickness T of containment section 42 is defined by a radial distance between inner surface 36A and outer surface 36B of annular body 36 within containment section 42.

Containment case 30 can include outer surface feature 56 and inner surface feature 58. Outer surface feature 56 and inner surface feature 58 features of containment case 30 that form a localized increase of casing thickness T. Outer surface feature 56 extends radially outward from outer surface 36B of annular body 36 that at least partially coincides axially with containment section 42. Inner surface feature 58 extends radially inward from inner surface 36A of annular body 36 within containment section 42. Example outer surface features 56 and inner surface features 58 include, but are not limited to, a bracket, a lug, a boss, a protrusion, a rib segment, and a ring segment, among other possible outer surface features 56, each with or without threaded or clearance fastener holes. Outer surface features 56 can be used to mount or attach components of gas turbine engine 10 exterior to containment case 30. Example gas turbine engine components include bleed air pipe, electrical conduit, lubrication lines, modules containing electrical components of gas turbine engine 10, among other possible components. Inner surface features 58 can be used to mount or attach components of gas turbine engine 10 within or adjacent a flow path of gas turbine engine. Example inner surface features 58 include, but are not limited to, attachment locations for bladed rotor shrouds, blade outer air seals (BOAS), baffles, and stationary blades, among other possible components.

During a blade out event or rotor burst event, blades and other fragments of bladed rotor 32 impact containment section 42 of containment case 30. The mass of the blade and/or rotor fragment(s), the rotational speed of bladed rotor 32, and the presence of one or more outer surface features 56 and, in some examples, one or more inner surface features 58 affect the impact energy imparted to containment case 30 during a blade or rotor failure. In order to minimize casing thickness T, containment case 30 includes reinforcement section 54 illustrated by FIG. 3 that extends along inner surface 36A. Reinforcement section 54 provides increased thickness of containment section 42 within a circumferential region that precedes outer surface feature 56 relative to a direction of rotation R of bladed rotor 32.

Figure 3:
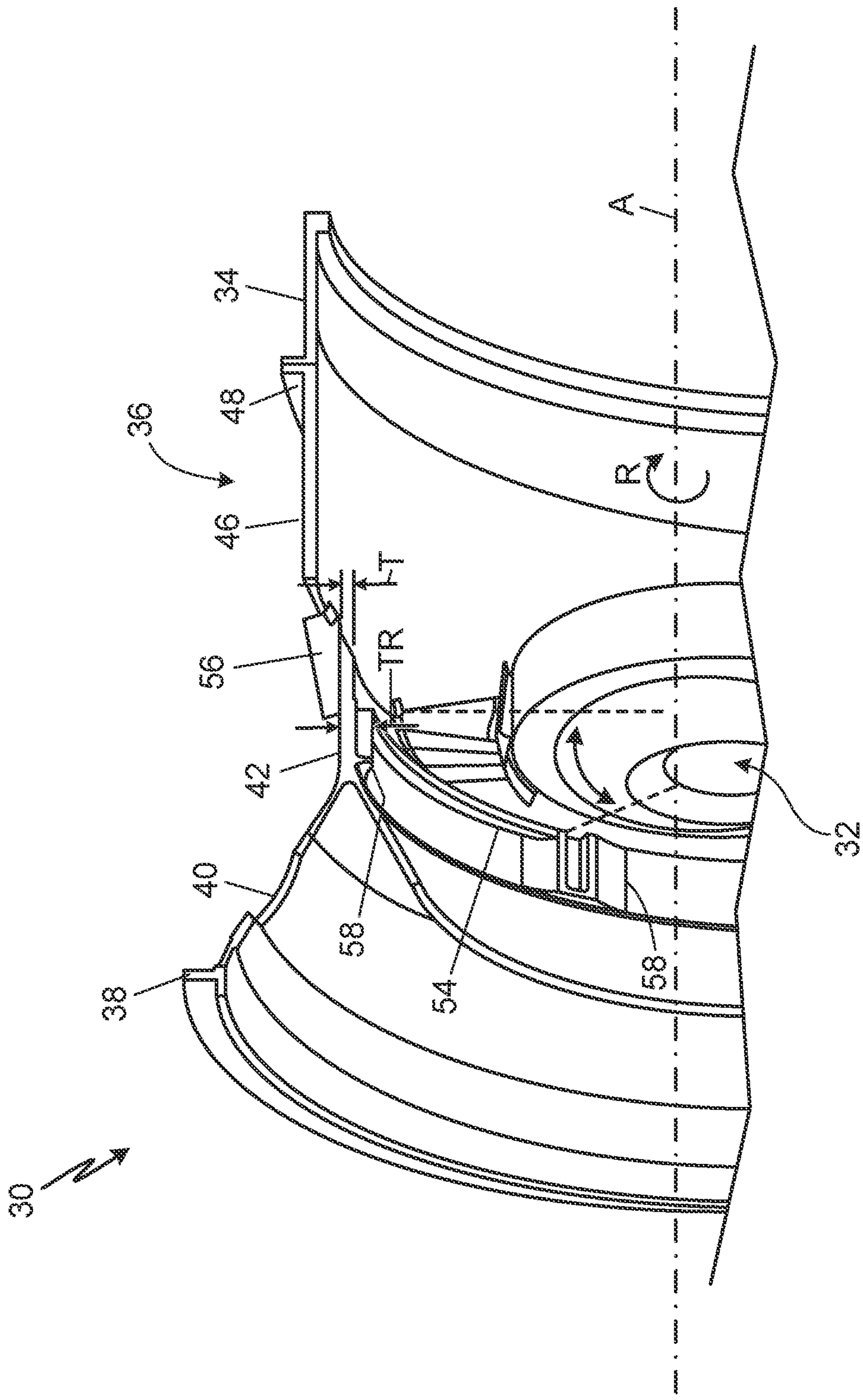
FIG. 3 is an isometric view depicting a partial cross-sectional of the containment case of FIG. 2 equipped with a reinforcement section spanning along an inner surface of the containment case.

FIG. 3 is a partial isometric cross-section of containment case 30 depicted with bladed rotor 32. As depicted in FIG. 3, containment case 30 includes outer surface feature 56 and a circumferential array of inner surface features 58, and bladed rotor 32 is a turbine rotor having a rotational direction R. Containment case 30 includes reinforcement section 54 that defines a thickened region of containment section 42.

Reinforcement section 54 is a thickened region of containment case 30 that subtends a sector along a radially inner side of containment section 42. Reinforcement thickness TR is the radial distance between inner surface 36A and outer surface 36B within reinforcement section 54. Reinforcement thickness TR is greater than casing thickness T within portions of containment section 54 that are circumferentially adjacent to reinforcement section 54. As shown, reinforcement section 54 is a rib that extends within the reinforcement sector. In other examples, reinforcement section 54 can have a greater axial extent than shown, extending up to an axial extent of containment section 42.

In the example depicted in FIG. 3, at least one of inner surface featured 58 can be circumferentially aligned with outer surface feature 56 about axis A. Aligning at least one inner surface feature 58 with outer surface feature 56 allows the increased thickness of inner surface feature 58 to locally increase the shear strength of containment section in the vicinity of outer surface feature 56. Additionally, reinforcement section 54 can span a sector of containment section 42 joining circumferentially adjacent inner surface features 58.

Reinforcement section 54 strengthens containment case 30 in a region proximate to outer surface feature 56 and allows reduction of case thickness T in a remainder of containment section 42. Accordingly, since reinforcement section 54 subtends a sector of containment section 42, the weight of containment case 30 can be reduced relative to an analogous containment case and predetermined impact energy.

DISCUSSION OF POSSIBLE EMBODIMENTS

The following are non-exclusive descriptions of possible embodiments of the present invention.

Containment Case with Inner Surface Reinforcement

A containment case according to an example embodiment of this disclosure, among other possible things includes an annular body, an outer surface feature, and an inner surface feature. The annular body is limited by an outer surface and an inner surface. The annular body includes a containment section and a reinforcement section. The containment section has a casing thickness defined by a radial distance between the inner surface and the outer surface. The reinforcement section subtends a sector of the containment section that defines a reinforcement thickness between the inner surface and the outer surface that is greater than the casing thickness. The outer surface feature extends outward from the outer surface and at least partially coincides with the reinforcement section. The inner surface feature extends inwards from the inner surface that at least partially coincides circumferentially with the outer surface feature and the reinforcement section.

The containment case of the preceding paragraph can optionally include, additionally and/or alternatively, any one or more of the following features, configurations and/or additional components.

A further embodiment of the foregoing containment case, wherein the inner surface feature can be one inner surface feature of a plurality of inner surface features.

A further embodiment of any of the foregoing containment cases, wherein the plurality of inner surface features can be spaced circumferentially along the inner surface of the annular body.

A further embodiment of any of the foregoing containment cases, wherein the reinforcement section can subtend a sector joining two circumferentially adjacent inner surface features of the plurality of inner surface features.

A further embodiment of any of the foregoing containment cases, wherein the reinforcement section can include a rib segment subtending the sector of the containment section.

A further embodiment of any of the foregoing containment cases, wherein the reinforcement section can circumferentially encompass the outer surface feature.

A Gas Turbine Engine with a Containment Case and Inner Surface Reinforcement

A gas turbine engine according to an example embodiment of this disclosure, among other possible things includes a bladed rotor and a containment case. The bladed rotor is operatively associated with a direction of rotation about an axis of the gas turbine engine. The containment case includes an annular body, an outer surface feature, and an inner surface feature. The annular body is limited by an outer surface and an inner surface. The annular body includes a containment section and a reinforcement section. The containment section has a casing thickness defined by a radial distance between the inner surface and the outer surface. The reinforcement section subtends a sector of the containment section that defines a reinforcement thickness between the inner surface and the outer surface that is greater than the casing thickness. The outer surface feature extends outward from the outer surface and at least partially coincides with the reinforcement section. The reinforcement section circumferentially precedes the outer surface feature relative to the direction of rotation. The inner surface extends inward from the inner surface and at least partially coincides circumferentially with the outer surface feature and the reinforcement section.

The gas turbine engine of the preceding paragraph can optionally include, additionally and/or alternatively, any one or more of the following features, configurations and/or additional components.

A further embodiment of the foregoing gas turbine engine, wherein the inner surface feature can be one inner surface feature of a plurality of inner surface features.

A further embodiment of any of the foregoing gas turbine engines, wherein the plurality of inner surface features can be spaced circumferentially about the axis of the gas turbine engine.

A further embodiment of any of the foregoing gas turbine engines, wherein the reinforcement section can subtend a sector joining two circumferentially adjacent inner surface features of the plurality of inner surface features.

A further embodiment of any of the foregoing gas turbine engines, wherein the reinforcement section can include a rib segment subtending the sector of the containment section.

A further embodiment of any of the foregoing gas turbine engines, wherein the reinforcement section can circumferentially encompass the outer surface feature.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A containment case comprising:

an annular body limited by an outer surface and an inner surface, the annular body comprising:

a containment section having a casing thickness defined by the radial distance between the inner surface and the outer surface, wherein the containment section is cylindrical;

a reinforcement section subtending a sector of the containment section radially inward from the inner surface, wherein a circumferential extent of the reinforcement section is less than the circumferential extent of the containment section;

a first frustoconical section extending axially and radially outward from a first end of containment section; and a second frustoconical section extending axially and radially outward from a second end of containment section opposite the first end;

an outer surface feature extending outward from the outer surface that at least partially coincides with the containment section, wherein the reinforcement section at least partially coincides with the outer surface feature, and wherein the outer surface feature coincides with a junction between the second frustoconical section and the containment section;

an inner surface feature extending inward from the inner surface that at least partially coincides circumferentially with the outer surface feature and the reinforcement section.

2. The containment case of claim 1, wherein the inner surface feature is one inner surface feature of a plurality of inner surface features, the plurality of inner surface features spaced circumferentially along the inner surface of the annular body.

3. The containment case of claim 2, wherein the reinforcement section subtends a sector joining two circumferentially adjacent inner surface features of the plurality of inner surface features.

4. The containment case of claim 3, wherein the reinforcement section includes a rib segment subtending the sector of the containment section.

5. The containment case of claim 1, wherein the reinforcement section circumferentially encompasses the outer surface feature.

6. A gas turbine engine comprising:

a bladed rotor operatively associated with a direction of rotation about an axis of the gas turbine engine; and a containment case comprising:

an annular body limited by an outer surface and an inner surface, the annular body comprising:

a containment section having a casing thickness defined by the radial distance between the inner surface and the outer surface, wherein the containment section is cylindrical;

a reinforcement section subtending a sector of the containment section radially inward from the inner surface, wherein a circumferential extent of the reinforcement section is less than the circumferential extent of the containment section;

a first frustoconical section extending axially and radially outward from a first end of containment section; and a second frustoconical section extending axially and radially outward from a second end of containment section opposite the first end;

an outer surface feature extending outward from the outer surface that at least partially coincides with the containment section, wherein the reinforcement section at least partially coincides with the outer surface feature, and wherein the reinforcement section circumferentially precedes the outer surface feature relative to the direction of rotation, wherein the outer surface feature coincides with a junction between the second frustoconical section and the containment section; and an inner surface feature extending inward from the inner surface that at least partially coincides circumferentially with the outer surface feature and the reinforcement section.

7. The gas turbine engine of claim 6, wherein the inner surface feature is one inner surface feature of a plurality of inner surface features, the plurality of inner surface features spaced circumferentially about the axis of the gas turbine engine.

8. The gas turbine engine of claim 7, wherein the reinforcement section subtends a sector joining two circumferentially adjacent inner surface features of the plurality of inner surface features.

9. The gas turbine engine of claim 8, wherein the reinforcement section includes a rib segment subtending the sector of the containment section.

10. The gas turbine engine of claim 6, wherein the reinforcement section circumferentially encompasses the outer surface feature.

11. The containment case of claim 1, wherein the reinforcement section has a reinforcement thickness greater than the casing thickness within portions of the containment section that are circumferentially adjacent to one or more of the reinforcement section and the inner surface feature.

12. The containment case of claim 1, wherein the inner surface feature is an attachment location for one of a rotor shroud, a blade outer air seal (BOAS), a baffle, and a stationary blade.

13. The containment case of claim 1, wherein the outer surface feature is one of a bracket, a lug, a boss, a protrusion, a rib segment, and a ring segment.

14. The gas turbine engine of claim 6, wherein the reinforcement section has a reinforcement thickness greater than the casing thickness within portions of the containment section that are circumferentially adjacent to one or more of the reinforcement section and the inner surface feature.

15. The gas turbine engine of claim 6, wherein the inner surface feature is an attachment location for one of a rotor shroud, a blade outer air seal (BOAS), a baffle, and a stationary blade.

16. The gas turbine engine of claim 6, wherein the outer surface feature is one of a bracket, a lug, a boss, a protrusion, a rib segment, and a ring segment.

* * * * *